Dec. 26, 1922.
A. PEACH.
TOBACCO FINISHER OR RIPENER.
FILED NOV. 17, 1920.
1,440,237.
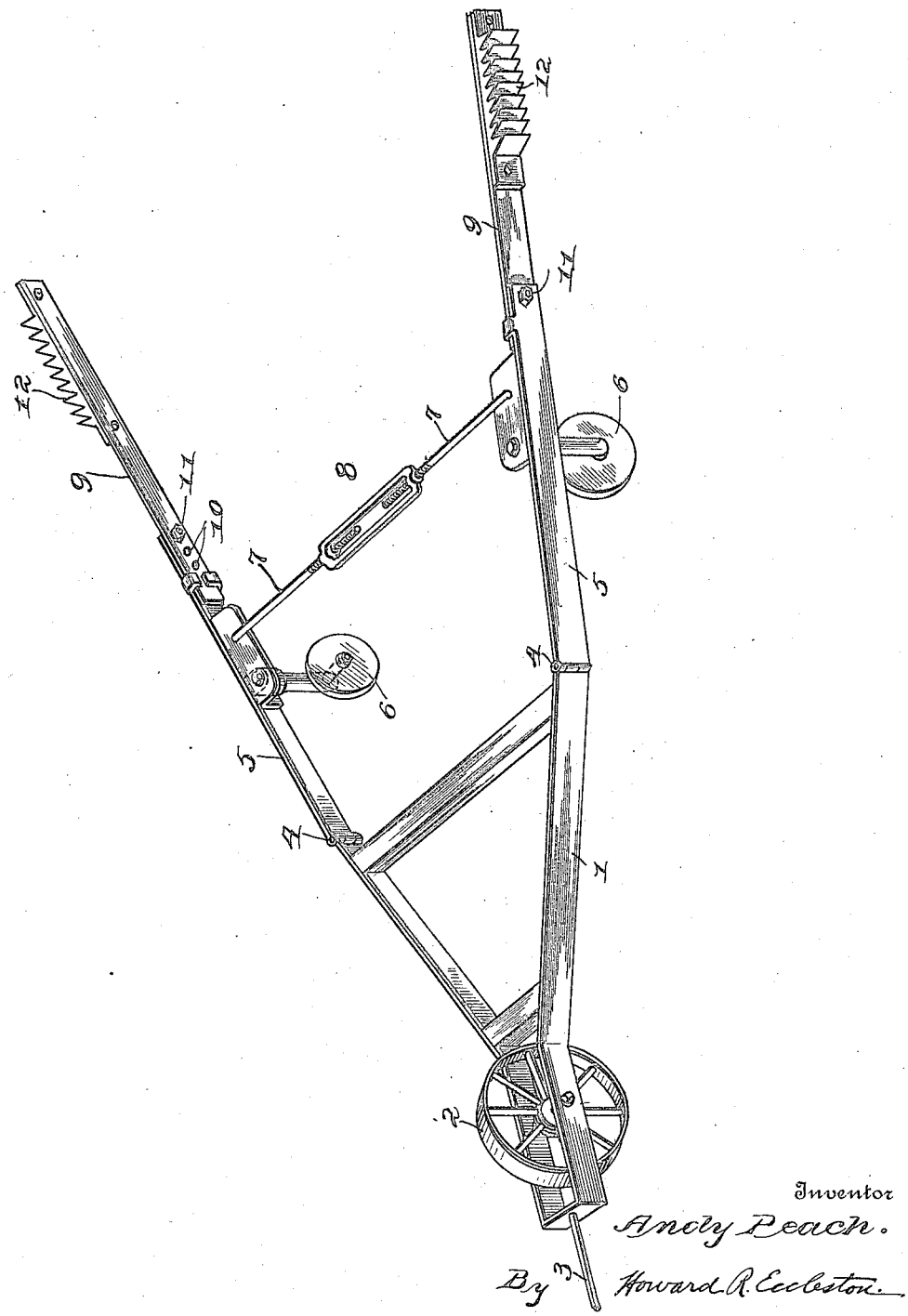
Inventor
Andy Peach.
By Howard R. Eccleston.
Attorney Patented Dec. 26, 1922.

1,440,237

UNITED STATES PATENT OFFICE.

ANDY PEACH, OF NEAR DANVILLE, KENTUCKY.

TOBACCO FINISHER OR RIPENER.

Application filed November 17, 1920. Serial No. 424,728.

*To all whom it may concern:*

Be it known that I, ANDY PEACH, residing near Danville, in the county of Boyle and State of Kentucky, have invented certain new and useful Improvements in Tobacco Finishers or Ripeners, of which the following is a full, clear, and exact description.

My invention relates to a machine for the treatment of plants, particularly tobacco plants, and one of the objects thereof is to provide means whereby the bark or outer covering of the growing tobacco stalk may be easily and expeditiously removed.

Another object of my invention resides in the provision of means of this character which may be adjusted in accordance with the varying width of tobacco rows.

A still further object of the invention consists in so constructing such a machine that it may simultaneously treat the plants on both sides of a tobacco row as it passes therethrough.

Other and further objects will appear as the description proceeds.

In tobacco growing and curing it is of the greatest importance to produce tobacco which when cured is a bright color, as it is this high grade smoking tobacco, particularly cigarette tobacco, which brings high prices on the market; the production of chewing grades and common grades of tobacco resulting in a great loss to the grower.

It is known that by removing the bark of a tobacco plant the growth of suckers is prevented and the plant begins to turn yellow causing it to cure a bright color. To treat each plant singly requires so much time and labor that its cost is prohibitive, and it is therefore the purpose of my invention to provide a machine which will treat plants in the above described manner, and which will also enable it to be done quickly and at low cost.

I will now describe in detail the machine by which the above objects are accomplished, reference being had to the accompanying drawings in which:

The figure is a perspective view of the complete apparatus.

Before proceeding with the detailed description I wish it to be clearly understood that it is not my intention to be limited to the particular construction shown, as obviously this may be changed in many ways and the machine as shown should be considered as illustrative rather than in a limiting sense.

With reference to the drawings, the main or rigid part of the frame is indicated by numeral 1 and suitably mounted therein is the guide wheel 2. Numeral 3 refers to the tongue by which the machine is drawn, either by hand or other power.

Pivotally attached to the main frame at 4, 4, are side frames 5, 5, by which construction the machine is adapted to use with tobacco rows of varying width.

Attached to the side frames are the rear wheels 6, 6, which are supported in any desired manner, it being preferable, however, to have the wheels inside of the frame, as shown, so that they will be clear of the tobacco stalks.

In order to adjust the side frames to the angle desired and to hold them in this desired position I provide pivotally mounted rods 7, 7, which may be connected by a turnbuckle 8.

Adjustably attached to the side frames are extension arms 9, 9. These arms are provided with a series of holes 10, and are held in adjusted position by bolts 11, 11. Attached to the outer wall of these arms are rasps or files 12, 12, which are adapted to attack the tobacco stalks and remove the bark therefrom.

The operation of the apparatus is as follows:

The machine is drawn between the tobacco rows by hand or other power, the rasps or files being previously set at the required distance apart to bring them into contact with one side of the plants on both sides of the machine. The bark is thus removed from one side of each plant, and as the machine passes down the other side of a row the treatment is completed, and so on for each row. The manner in which the adjustments are made will be obvious from the previous description. It is only necessary to rotate the turnbuckle 8 thereby increasing or decreasing the distance between the extension arms as desired. If needed, a further adjustment is accomplished by means of the sliding connection between the extension arms and the side frames.

The particular means by which the various adjustments are effected form no material part of this invention as many equivalent means may be substituted. It will also be apparent that the rasps may be made integral with the extension arms if desired, instead of being attached thereto as illustrated.

Tobacco plants which are treated in the above described manner stop growing suckers and begin to turn yellow, and when cured in the usual way the tobacco has the bright yellow color of high grade tobacco. This treatment also removes all danger of second growth and house-burning.

Having fully described my invention, what I claim as new and desire to secure by Letters Patent is:

1. An apparatus of the character described including a frame adapted to be drawn between two tobacco rows, and means carried thereby for stripping bark from the plants on both sides of the apparatus.

2. A tobacco finisher or ripener including a frame adapted to be drawn between tobacco rows, a rearwardly extending arm carried by said frame, and a rasp or file on the outer wall of said arm.

3. A tobacco finisher or ripener including a frame adapted to be drawn between two tobacco rows, and a plurality of rasps or files carried thereby for removing the bark from tobacco plants on both sides of the apparatus.

4. A tobacco finisher or ripener including a frame adapted to be drawn between tobacco rows, and a plurality of rasps or files adjustably attached to said frame for engaging tobacco plants simultaneously on both sides of the frame.

5. A tobacco finisher or ripener including a frame mounted on rollers and adapted to be drawn between tobacco rows, an arm carried by the frame, a rasp carried by said arm, and means for slidably adjusting the arm.

6. A tobacco finisher or ripener including a main frame adapted to be drawn between tobacco rows, side frames pivotally attached to the main frame, and rasps or files carried by the side frames.

7. A tobacco finisher or ripener including a main frame adapted to be drawn between tobacco rows, side frames pivotally attached to the main frame, means for angularly adjusting the position of the side frames, and rasps or files carried by the side frames.

8. A tobacco finisher or ripener including a main frame adapted to be drawn between tobacco rows, side frames pivotally attached to the main frame, rearwardly extending arms connected with the side frames, and rasps or files carried by the rearwardly extending arms.

9. A tobacco finisher or ripener including a main frame, side frames pivotally attached to the main frame, a turnbuckle operatively connected with the side frames and providing means for angularly adjusting same, rearwardly extending arms carried by the side frames, means for longitudinally adjusting the arms with respect to the side frames, and rasps or files carried on the outer walls of said arms.

ANDY PEACH.